(12) United States Patent
Kirovski et al.

(10) Patent No.: US 7,197,368 B2
(45) Date of Patent: Mar. 27, 2007

(54) AUDIO WATERMARKING WITH DUAL WATERMARKS

(75) Inventors: Darko Kirovski, Redmond, WA (US); Henrique Malvar, Redmond, WA (US); Mariusz H. Jakubowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/620,253

(22) Filed: Jul. 15, 2003

(65) Prior Publication Data

US 2004/0059581 A1 Mar. 25, 2004

Related U.S. Application Data

(63) Continuation of application No. 09/316,899, filed on May 22, 1999, now Pat. No. 6,952,774.

(51) Int. Cl.
*G06F 17/00* (2006.01)
*H04K 1/00* (2006.01)
*H04L 9/32* (2006.01)
*H04N 7/16* (2006.01)

(52) U.S. Cl. ............................ 700/94; 713/176; 726/32
(58) Field of Classification Search ................... 700/94; 713/176; 380/200, 201; 726/26, 32
See application file for complete search history.

(56) References Cited

U.S. PATENT DOCUMENTS 5,646,997 A 7/1997 Barton (Continued)

FOREIGN PATENT DOCUMENTS

| EP | 0581317 | 7/1993 |
|---|---|---|
| EP | 0770498 | 2/1997 |
| EP | 0840513 | 11/1997 |

(Continued)

OTHER PUBLICATIONS

Swanson, et al.; "Robust Audio Watermarking Using Perceptual Masking"; Signal Processing 66, 1998; pp. 337-355.

(Continued)

*Primary Examiner*—Sinh Tran
*Assistant Examiner*—Daniel R. Sellers
(74) *Attorney, Agent, or Firm*—Lee & Hayes, PLLC

(57) ABSTRACT

A watermark encoding system encodes an audio signal with both a strong and a weak watermark. The strong watermark identifies the content producer and is designed to survive all typical kinds of processing and malicious attacks. The weak watermark identifies the content as an original and is designed to be significantly removed as a result of most normal signal processing (other than A/D and D/A). The watermark encoding system has a converter to convert an audio signal into frequency and phase components and a mask processor to determine a hearing threshold for corresponding frequency components. The watermark encoding system also has a pattern generator to generate both the strong and weak watermarks and a watermark insertion unit to selectively insert either the strong or weak watermark into the audio signal. The watermark insertion unit adds the strong watermark to the audio signal when the signal exceeds the hearing threshold by a buffer value (e.g., 1–8 dB) and adds the weak watermark insertion unit when the signal falls below the hearing threshold by the buffer value. When the signal falls within the buffer area about the hearing threshold, the insertion unit takes no action. A watermark detecting system is equipped with a watermark detector that determines which block interval of the watermarked audio signal contains a watermark pattern and if the strong or weak watermark is present in that block interval of the signal.

18 Claims, 10 Drawing Sheets

U.S. PATENT DOCUMENTS

| | | | |
|---|---|---|---|
| 5,687,236 A | 11/1997 | Moskowitz et al. | |
| 5,745,604 A | 4/1998 | Rhoads et al. | |
| 5,809,139 A | 9/1998 | Girod et al. | |
| 5,822,360 A | 10/1998 | Lee et al. | |
| 5,822,432 A | 10/1998 | Moskowitz et al. | |
| 5,889,868 A | 3/1999 | Moskowitz et al. | |
| 5,905,800 A | 5/1999 | Moskowitz et al. | |
| 5,917,914 A | 6/1999 | Shaw et al. | |
| 5,930,369 A | 7/1999 | Cox et al. | |
| 5,933,798 A | 8/1999 | Linnartz | |
| 5,991,426 A | 11/1999 | Cox et al. | |
| 6,024,287 A | 2/2000 | Takai et al. | |
| 6,029,126 A | 2/2000 | Malvar | |
| 6,031,914 A | 2/2000 | Tewfik et al. | |
| 6,064,738 A | 5/2000 | Fridrich | |
| 6,064,764 A * | 5/2000 | Bhaskaran et al. | 382/183 |
| 6,094,483 A | 7/2000 | Fridrich et al. | |
| 6,128,736 A | 10/2000 | Miller | |
| 6,131,162 A | 10/2000 | Yoshiura et al. | |
| 6,192,139 B1 | 2/2001 | Tao | |
| 6,208,735 B1 | 3/2001 | Cox et al. | |
| 6,208,745 B1 | 3/2001 | Florencio et al. | |
| 6,209,094 B1 | 3/2001 | Levine et al. | |
| 6,219,634 B1 | 4/2001 | Levine | |
| 6,256,736 B1 | 7/2001 | Coppersmith et al. | |
| 6,259,801 B1 | 7/2001 | Wakasu | |
| 6,275,599 B1 | 8/2001 | Adler et al. | |
| 6,282,300 B1 | 8/2001 | Bloom et al. | |
| 6,330,672 B1 | 12/2001 | Shur | |
| 6,332,031 B1 | 12/2001 | Rhoads et al. | |
| 6,332,194 B1 | 12/2001 | Bloom et al. | |
| 6,334,187 B1 | 12/2001 | Kadono | |
| 6,408,082 B1 | 6/2002 | Rhoads et al. | |
| 6,487,574 B1 | 11/2002 | Malvar | |
| 6,504,941 B2 | 1/2003 | Wong | |
| 6,523,113 B1 | 2/2003 | Wehrenberg | |
| 6,553,127 B1 * | 4/2003 | Kurowski | 382/100 |
| 6,585,341 B1 | 7/2003 | Walker et al. | |
| 6,591,365 B1 * | 7/2003 | Cookson | 713/176 |
| 6,608,867 B2 | 8/2003 | Zhong et al. | |
| 6,614,914 B1 | 9/2003 | Rhoads et al. | |
| 6,778,678 B1 | 8/2004 | Podilchuk et al. | |
| 6,807,634 B1 | 10/2004 | Braudaway et al. | |
| 2001/0000701 A1 | 5/2001 | Carneheim et al. | |
| 2002/0009208 A1 | 1/2002 | Alattar et al. | |

FOREIGN PATENT DOCUMENTS

| | | |
|---|---|---|
| EP | 0899948 | 8/1998 |
| EP | 0913952 | 5/1999 |
| EP | 1 017049 A2 | 7/2000 |
| JP | 11110913 | 4/1999 |
| WO | WO 98/03014 | 1/1998 |
| WO | 99/11020 | 8/1998 |

OTHER PUBLICATIONS

Zhou, et al; "A Generic Digital Watermarking Model"; Comput. & Graphics, vol. 22, No. 4, 1998; pp. 3974-4403.

Mintzer et al; "If One Watermark is good, are more better?"; Acoustics, Speech, and Signal Processing, 1999; Proceedings 1999 IEEE International Conference on Mar. 19, 1999; pp. 2067-2069.

Kankanhalli et al. "Content Based Watermarking of Images" 1998 ACM Multimedia '98 p. 61-70.

Kirovski et al. Robust Spread-; "Robust Spread-Spectrum Audio Watermarking" 2001 IEEE p. 1345-1348.

Fridrich, "Image Watermarking for Tamper Detection", 1998, citeseer.ist.psu.edu/fridrich98image.html, 5 pages.

Cox, et al., "Secure Spread Spectrum Watermarking for Multimedia", IEEE, 1997, IEEE Transactions on Image Processing, vol. 6, No. 12, Dec. 1997, pp. 1673-1687.

* cited by examiner

AUDIO WATERMARKING WITH DUAL WATERMARKS

This is a continuation of U.S. patent application Ser. No. 09/316,899, filed May 22, 1999, which is now U.S. Pat. No. 6,952,774.

TECHNICAL FIELD

This invention relates to systems and methods for protecting audio content. More particularly, this invention relates to watermarking audio data streams with two different watermarks.

BACKGROUND

Music is the world's universal form of communication, touching every person of every culture on the globe. Behind the melody is a growing multi-billion dollar per year industry. This industry, however, is constantly plagued by lost revenues due to music piracy.

Piracy is not a new problem. But, as technologies change and improve, there are new challenges to protecting music content from illicit copying and theft. For instance, more producers are beginning to use the Internet to distribute music content. In this form of distribution, the content merely exists as a bit stream which, if left unprotected, can be easily copied and reproduced. At the end of 1997, the International Federation of the Phonographic Industry (IFPI), the British Phonographic Industry, and the Recording Industry Association of America (RIAA) engaged in a project to survey the extent of unauthorized use of music on the Internet. The initial search indicated that at any one time there could be up to 80,000 infringing MP3 files on the Internet. The actual number of servers on the Internet hosting infringing files was estimated to 2,000 with locations in over 30 countries around the world.

Consequently, techniques for identifying copyright of digital audio content and in particular audio watermarking have received a great deal of attention in both the industrial community and the academic environment. One of the most promising audio watermarking techniques is augmentation of a copyright watermark into the audio signal itself by altering the signal's frequency spectrum such that the perceptual characteristics of the original recording are preserved. The copy detection process is performed by synchronously correlating the suspected audio clip with the watermark of the content publisher. A common pitfall for all watermarking systems that facilitate this type of data hiding is intolerance to desynchronization attacks (e.g., sample cropping, insertion, and repetition, variable pitch-scale and time-scale modifications, audio restoration, combinations of different attacks) and deficiency of adequate techniques to address this problem during the detection process.

The business model of companies that deliver products for audio copyright enforcement has been focused on satisfying the minimal set of requirements in the IFPI's and RIAA's Request for Proposals (MUSE project) for technologies that inaudibly embed data in sound recordings. More recently, the RIAA has started the Secure Digital Music Initiative (SDMJ) Forum in order to establish a standard for managing audio content copyrights. The requirements in both requests do not reflect accurately the common de-synch.

The existing techniques for watermarking discrete audio signals facilitate the insensitivity of the human auditory system (HAS) to certain audio phenomena. It has been demonstrated that, in the temporal domain, the HAS is insensitive to small signal level changes and peaks in the pre-echo and the decaying echo spectrum. The techniques developed to facilitate the first phenomenon are typically not resilient to de-synch attacks. Due to the difficulty of the echo cancellation problem, techniques which employ multiple decaying echoes to place a peak in the signal's cepstrum can hardly be attacked in real-time, but fairly easy using an off-line exhaustive search.

Watermarking techniques that embed secret data in the frequency domain of a signal facilitate the insensitivity of the HAS to small magnitude and phase changes. In both cases, publisher's secret key is encoded as a pseudo-random sequence that is used to guide the modification of each magnitude or phase component of the frequency domain. The modifications are performed either directly or shaped according to signal's envelope. In addition, a watermarking scheme has been developed which facilitates the advantages but also suffers from the disadvantages of hiding data in both the time and frequency domain. All reported approaches perform the watermark detection process on both the audible and inaudible spectrum components, thus enabling the attacker to reduce the correlation between the watermarked signal and its watermark by adding noise in the inaudible domain. Similarly, it has not been demonstrated whether these watermarking schemes would survive combinations of common attacks: de-synch in both the temporal and frequency domain and mosaic-like attacks.

Accordingly, there is a need for a new framework of protocols for hiding and detecting watermarks in digital audio signals that are effective against desynchronization attacks. The framework should possess several attributes, including perceptual invisibility (i.e., the embedded information should not induce audible changes in the audio quality of the resulting watermarked signal) and statistical invisibility (i.e., the embedded information should be quantitatively imperceptive for any exhaustive, heuristic, or probabilistic attempt to detect or remove the watermark). Additionally, the framework should be tamperproof (i.e., an attempt to remove the watermark should damage the value of the music well above the hearing threshold) and inexpensive to license and implement on both programmable and application-specific platforms. The framework should be such that the process of proving audio content copyright both in-situ and in-court does not involve usage of the original recording.

The framework should also be flexible to enable a spectrum of protection levels, which correspond to variable audio presentation and compression standards, and yet resilient to common attacks spawned by powerful digital sound editing tools. The standard set of plausible attacks is itemized in the IFPI's and RIAA's Request for Proposals and, among others, it encapsulates the following security requirements:

Two successive D/A and A/D conversions;
Data reduction coding techniques such as MP3;
Adaptive transform coding;
Adaptive subband coding;
Digital Audio Broadcasting (DAB);
Dolby AC2 and AC3 systems;
Applying additive or multiplicative noise;
Applying a second Embedded Signal, using the same system, to a single program fragment;
Frequency response distortion corresponding to normal analogue frequency response controls such as bass, mid and treble controls, with maximum variation of 15 dB with respect to the original signal; and Applying frequency notches with possible frequency hopping.

SUMMARY

This invention concerns an audio watermarking technology for inserting and detecting strong and weak watermarks in audio signals. The strong watermark identifies the content producer, providing a signature that is embedded in the audio signal and cannot be removed. The strong watermark is designed to survive all typical kinds of processing, including compression, equalization, D/A and A/D conversion, recording on analog tape, and so forth. It is also designed to survive malicious attacks that attempt to remove the watermark from the signal, including changes in time and frequency scales, pitch shifting, and cut/paste editing.

The weak watermark identifies the content as an original. With the exception of D/A and A/D conversion with good fidelity, other kinds of processing (especially compression) significantly remove the weak watermark. In this manner, an audio signal can be readily identified as an original or a copy depending upon the presence or absence of the weak watermark signature.

In one described implementation, a watermark encoding system is implemented at a content provider/producer to encode the audio signal with both a strong and a weak watermark. The watermark encoding system has a converter to convert an audio signal into frequency and phase components and a mask processor to determine a hearing threshold for corresponding frequency components. The watermark encoding system also has a pattern generator to generate both the strong and weak watermarks, and a watermark insertion unit to selectively insert either the strong or weak watermark into the audio signal. More particularly, the watermark insertion unit adds the strong watermark to the audio signal when the signal exceeds the hearing threshold by a buffer value (e.g., 1–8 dB). If the signal falls below the hearing threshold by more than the buffer value, the watermark insertion unit adds the weak watermark component to the audio signal. When the signal falls within the buffer area about the hearing threshold, the insertion unit takes no action because the signal component is not significantly above or below the threshold to be watermarked.

A watermark detecting system is implemented at a client that plays the audio clip. Like the encoding system, the watermark detecting system has the converter, the mask processor, and the watermark pattern generator. It is also equipped with a watermark detector that locates any strong and weak watermarks in the audio clip. The watermark detector determines which block interval of the watermarked audio signal contains the watermark pattern and if the strong or weak watermark generated by a particular set of keys is present in that block interval of the signal.

BRIEF DESCRIPTION OF THE DRAWINGS

The same numbers are used throughout the drawings to reference like elements and features.

DETAILED DESCRIPTION

Figure 1:
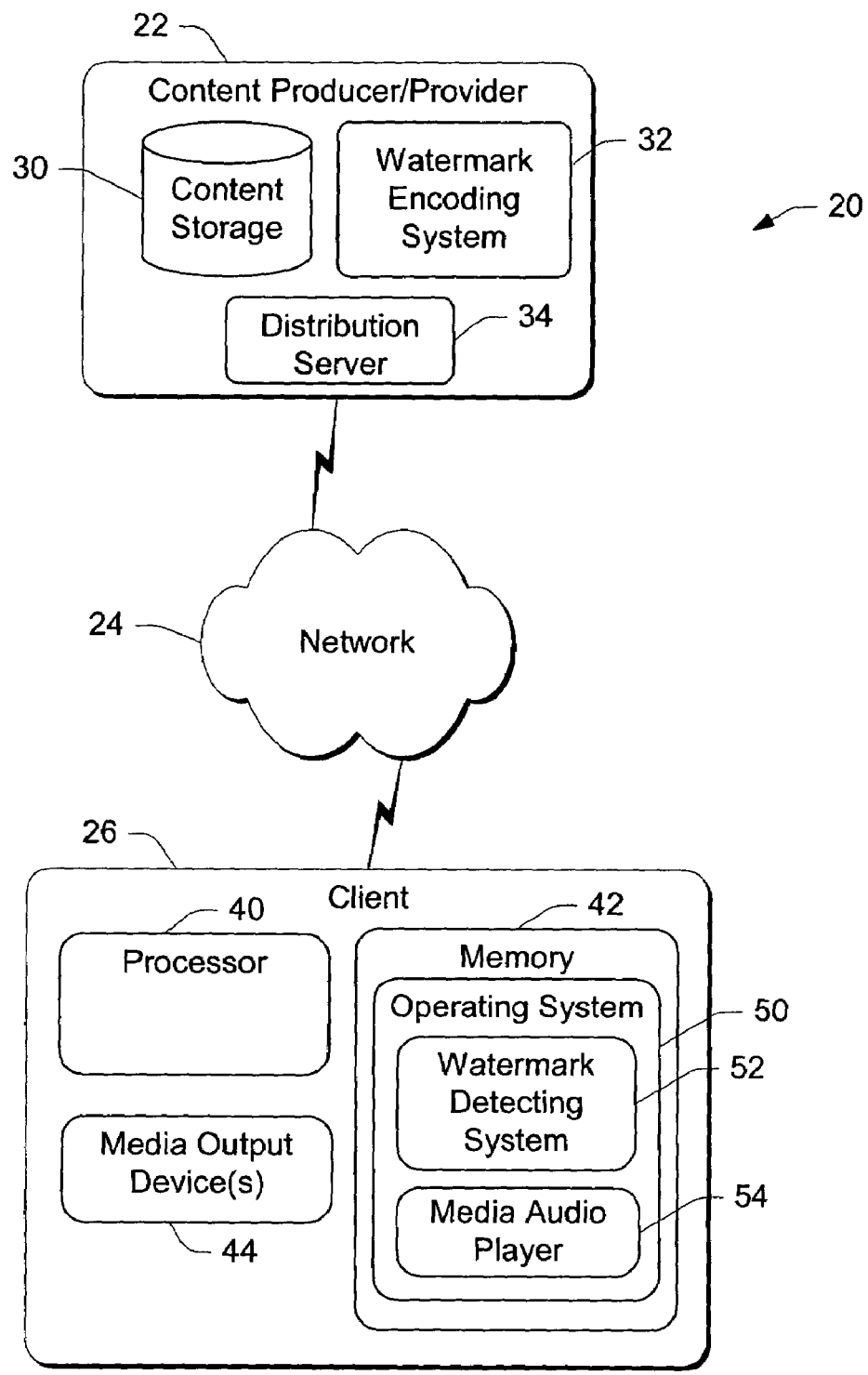
FIG. 1 is a block diagram of an audio production and distribution system in which a content producer/provider watermarks audio signals and subsequently distributes that watermarked audio stream to a client over a network.

FIG. 1 shows an audio production and distribution system 20 having a content producer/provider 22 that produces original musical content and distributes the musical content over a network 24 to a client 26. The content producer/provider 22 has a content storage 30 to store digital audio streams of original musical content. The content producer 22 has a watermark encoding system 32 to sign the audio data stream with a watermark that uniquely identifies the content as original. The watermark encoding system 32 may be implemented as a standalone process or incorporated into other applications or an operating system.

A watermark is an array of bits generated using a cryptographically secure pseudo-random bit generator and a new error correction encoder. The pseudo-uniqueness of each watermark is provided by initiating the bit generator with a key unique to each audio content publisher. The watermark is embedded into a digital audio signal by altering its frequency magnitudes such that the perceptual audio characteristics of the original recording are preserved. Each magnitude in the frequency spectrum is altered according to the appropriate bit in the watermark.

The watermark encoding system 32 applies two types of watermarks: a strong watermark and a weak watermark. The strong watermark identifies the content producer 22, providing a signature that is embedded in the audio signal and cannot be removed. The strong watermark is designed to survive all typical kinds of processing, including compression, equalization, D/A and A/D conversion, recording on analog tape, and so forth. It is also designed to survive malicious attacks that attempt to remove the watermark from the signal, including changes in time and frequency scales, pitch shifting, and cut/paste editing. The weak watermark identifies the content as an original. With the exception of D/A and A/D conversion with good fidelity, other kinds of processing (especially compression) significantly remove the weak watermark. In this manner, an audio signal can be readily identified as an original or a copy depending upon the presence or absence of the weak watermark signature.

The content producer/provider 22 has a distribution sewer 34 that streams the watermarked audio content over the network 24 (e.g., Internet). An audio stream with both watermarks embedded therein represents to a recipient that the stream is original and being distributed in accordance with the copyright authority of the content producer/provider 22. The server 34 may further compress and/or encrypt the content using conventional compression and encryption techniques prior to distributing the content over the network 24.

The client 26 is equipped with a processor 40, a memory 42, and one or more media output devices 44. The processor 40 runs various tools to process the audio stream, such as tools to decompress the stream, decrypt the date, filter the content, and/or apply audio controls (tone, volume, etc.). The memory 42 stores an operating system 50, such as a Windows brand operating system from Microsoft Corporation, which executes on the processor. The client 26 may be embodied in many different ways, including a computer, a handheld entertainment device, a set-top box, a television, an audio appliance, and so forth.

The operating system 50 implements a client-side watermark detecting system 52 to detect the strong and weak watermarks in the audio stream and a media audio player 54 to facilitate play of the audio content through the media output device(s) 44 (e.g., sound card, speakers, etc.). If both watermarks are present, the client is assured that the content is original and can be played. Absence of the weak watermark indicates that the audio stream is a copy of an original. If both watermarks are absent, the content is neither a protected original nor a copy of a protected original. The operating system 50 and/or processor 40 may be configured to enforce certain rules imposed by the content producer/provider (or copyright owner). For instance, the operating system and/or processor may be configured to reject fake or copied content that does not possess both strong and weak watermarks. In another example, the system could play unverified content with a reduced level of fidelity.

Dual Watermark Insertion

Figure 2:
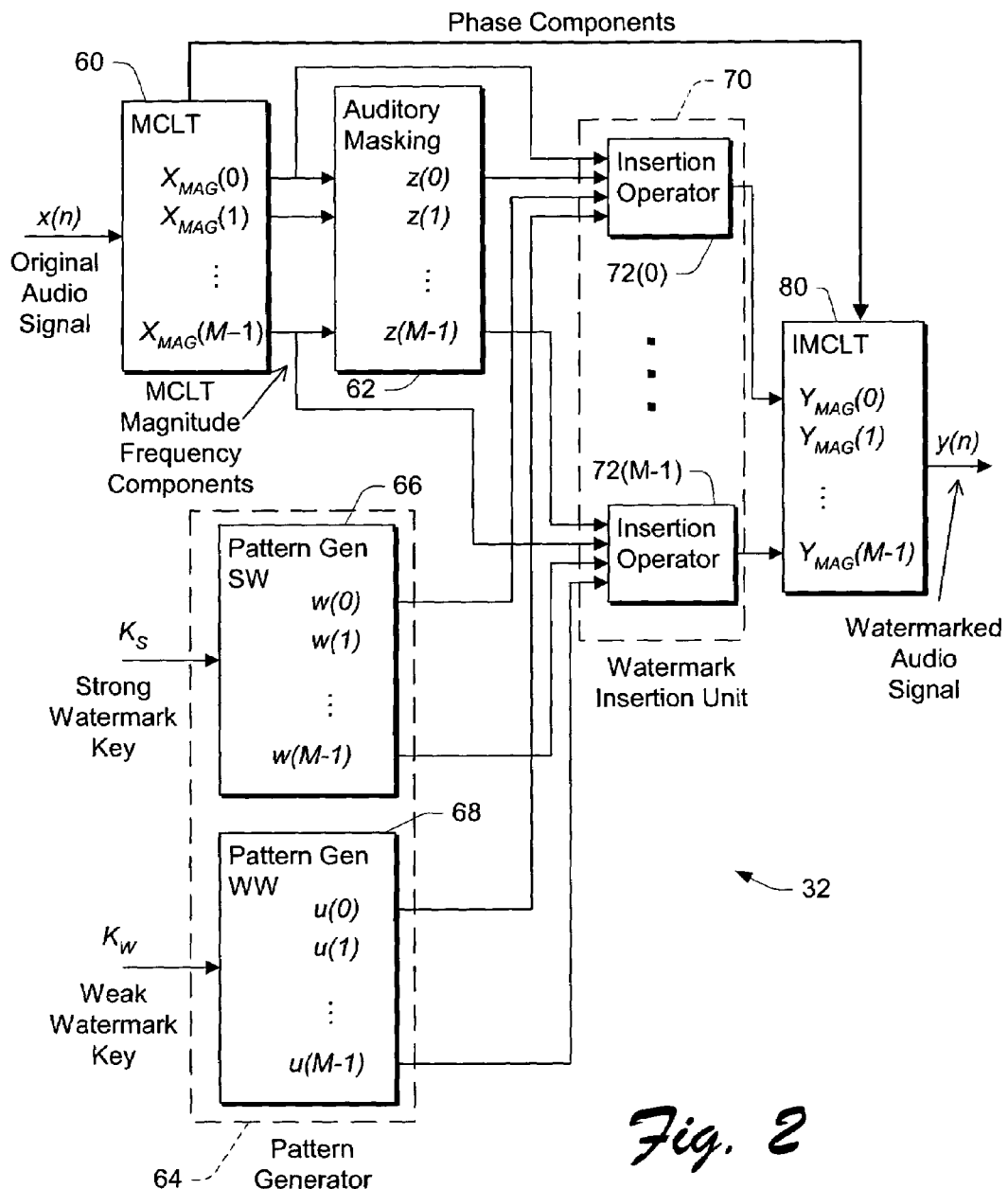
FIG. 2 is a block diagram of a watermarking encoding unit implemented, for example, at the content producer/provider.

FIG. 2 shows one implementation of the watermark encoding system 32. It receives an original audio signal x(n) and produces a watermarked audio signal y(n). The original signal is processed in blocks of M samples and stored in the content storage 30 (FIG. 1). Typically, M is set to 2,048 for CD-quality signals sampled at 44.1 kHz, corresponding to a block time duration of about 46.4 ms. The encoding system 32 has an MCLT (modulated complex lapped transform) component 60 that transforms the input signal x(n) to the frequency domain, producing the vector X(k) also with M components (i.e., k=0, 1, ..., M−1). Each X(k) is a complex number, and $X_{MAG}(k)$ is referred to as its magnitude and $\phi(k)$ as its phase. The magnitude is measured in a logarithmic scale, in decibels (dB). One specific implementation of the MCLT component 60 is described in more detail in a co-pending patent application, entitled "A system and Method for Producing Modulated Complex Lapped Transforms", which was filed Feb. 26, 1999 and is assigned to Microsoft Corporation. This application is incorporated by reference.

The magnitude frequency components $X_{MAG}(k)$ are processed by an auditory masking model processor 62, which computes a set of hearing thresholds z(k) (k=0, 1, ..., M−1), one for each frequency. The auditory masking model processor 62 simulates the dynamics of the human ear and computes z(k) such that $X_{MAG}(k)$ is audible only if its value is above z(k). One example implementation of a masking model is a codec employed in "MSAudio", a product available from Microsoft Corporation. This codec is described in a co-pending U.S. patent application Ser. No. 09/085,620, entitled "Scalable Audio Coder and Decoder", which was filed May 27, 1998 and is assigned to Microsoft Corporation. This application is incorporated by reference.

Figure 3:
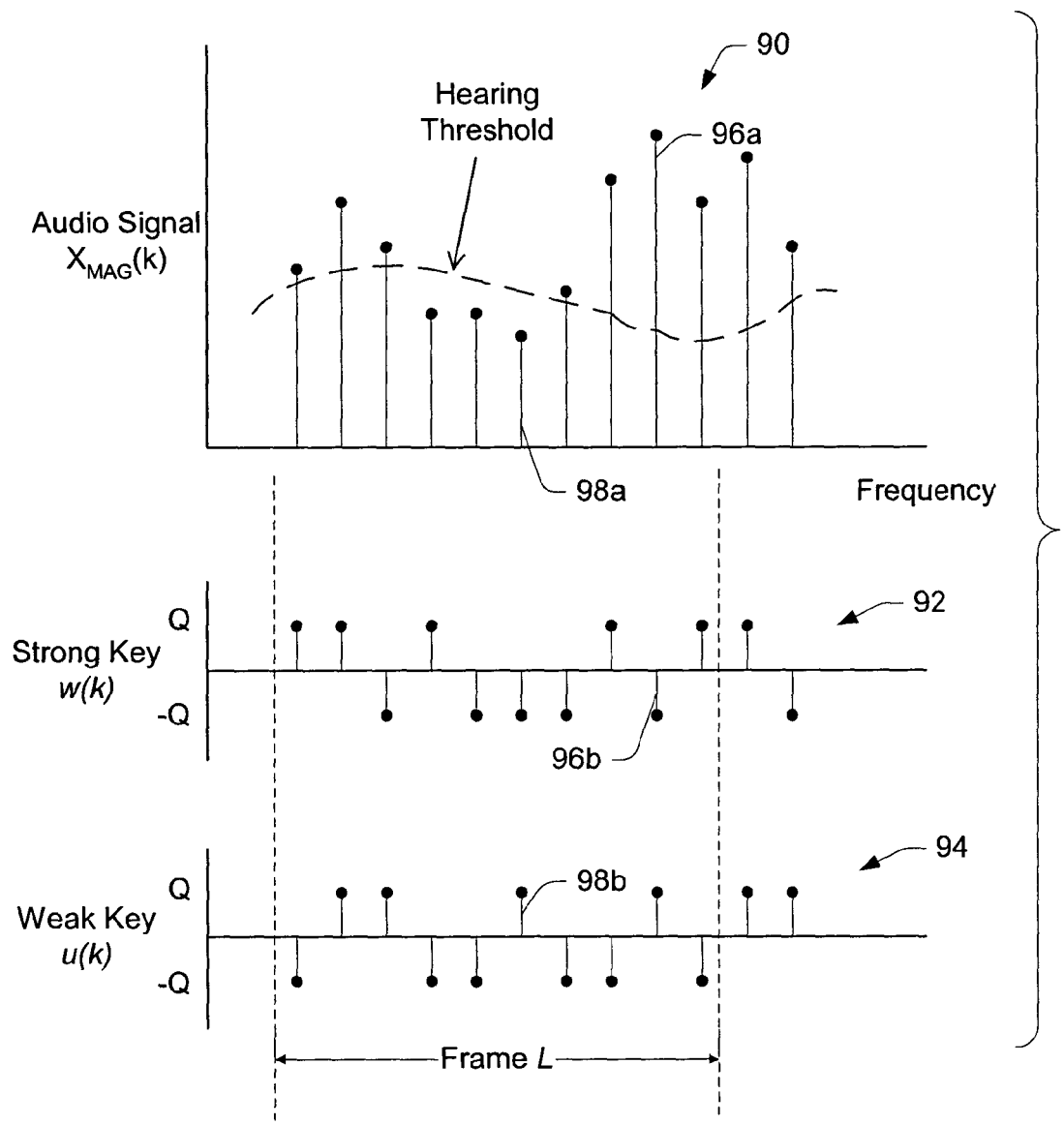
FIG. 3 is a frequency domain representation of an audio signal along with corresponding strong and weak watermarking components.

FIG. 3 is a frequency domain plot 90 showing samples of the audio signal's magnitude frequency components $X_{MAG}(k)$. The auditory masking model processor 62 computes a hearing threshold from the magnitude frequency components that dictate whether an individual sample is audible or not. In this illustration, samples rising above the threshold are audible, whereas samples falling below the threshold are not audible.

With reference again to FIG. 2, a pattern generator 64 creates strong and weak watermark signatures that will be selectively mixed with the audio signal. The pattern generator is illustrated as having a strong watermark generator 66 to produce a strong watermark vector w(k) using a cryptographic algorithm controlled by a key $K_S$. The pattern generator 64 also has a weak watermark generator 68 to produce a weak watermark vector u(k) using a cryptographic algorithm controlled by a key $K_W$. The strong and weak generators 66 and 68 may be implemented separately, or integrated as the same unit with the only difference being the key used to produce the desired strong or weak pattern.

A new vector is only generated for every L blocks, which constitute a frame. The parameter L is typically set to 10, as discussed below. Also, the strong watermark vector w(k) is such that w(k) remains constant for a group of frequencies, e.g. $w(0)=w(1)= \ldots =w(N_0)$, $w(N_0+1)=w(N_0+2)= \ldots =w(N_1)$, and so forth, with the parameters $N_0$, $N_1$, etc. typically approximating a Bark frequency scale or another appropriate frequency scale.

The components of the strong watermark vector w(k) and weak watermark vector u(k) are binary entries, with values equal to −Q or +Q (in decibels). In a typical application, Q may be set to 1 dB, for example. The keys and cryptographic algorithm are selected such that the strong and weak watermark values have zero mean, meaning that any given value is equally likely to assume values +Q or −Q.

FIG. 3 shows frequency plot 92 with a few samples from the strong watermark vector and a frequency plot 94 with a few samples from the weak watermark vector u(k). The patterns are generated based upon the respective strong and weak keys $K_S$ and $K_W$.

The watermark encoding system 32 has a watermark insertion unit 70 that selectively combines either the strong watermark vector w(k) or the weak watermark vector u(k) with the magnitude frequency components $X_{MAG}(k)$ from MCLT component 60 based upon the hearing threshold vector z(k) from masking model 62. The watermark insertion unit 70 has multiple insertion operators 72(0), 72(1), ..., 72(k) (k=0, 1, ..., M−1) for each corresponding frequency. In this manner, for each frequency index k, the magnitude frequency components $X_{MAG}(k)$ is modified to generate the watermarked magnitude frequency components $Y_{MAG}(k)$. More specifically, each insertion operation modifies its magnitude frequency components $X_{MAG}(k)$ with the strong watermark value w(k) if the magnitude frequency component exceeds the hearing threshold z(k) and alternatively, with the weak watermark value u(k) if the magnitude frequency component fails to exceed the hearing threshold z(k). The insertion process is described below in more detail with reference to FIGS. 3 and 4.

An IMCLT (Inverse MCLT) component 80 receives the watermarked magnitude frequency components $Y_{MAG}(k)$ from the watermark insertion unit 70 and the phases $\phi(k)$ from the MCLT component 60. The IMCLT component 80 converts the frequency-domain signal $\{Y_{MAG}(k), \phi(k)\}$ to a time-domain watermarked signal block y(n). The time domain audio signal is in a form that can then be stored in the content storage 30 and/or distributed over the network 24 to the client 26.

The insertion process is repeated through a group of T blocks. The parameter T controls the length of the watermark, and is typically set between 20 and 300 blocks. Larger values of T result in more reliable detection, as described below.

Figure 4:
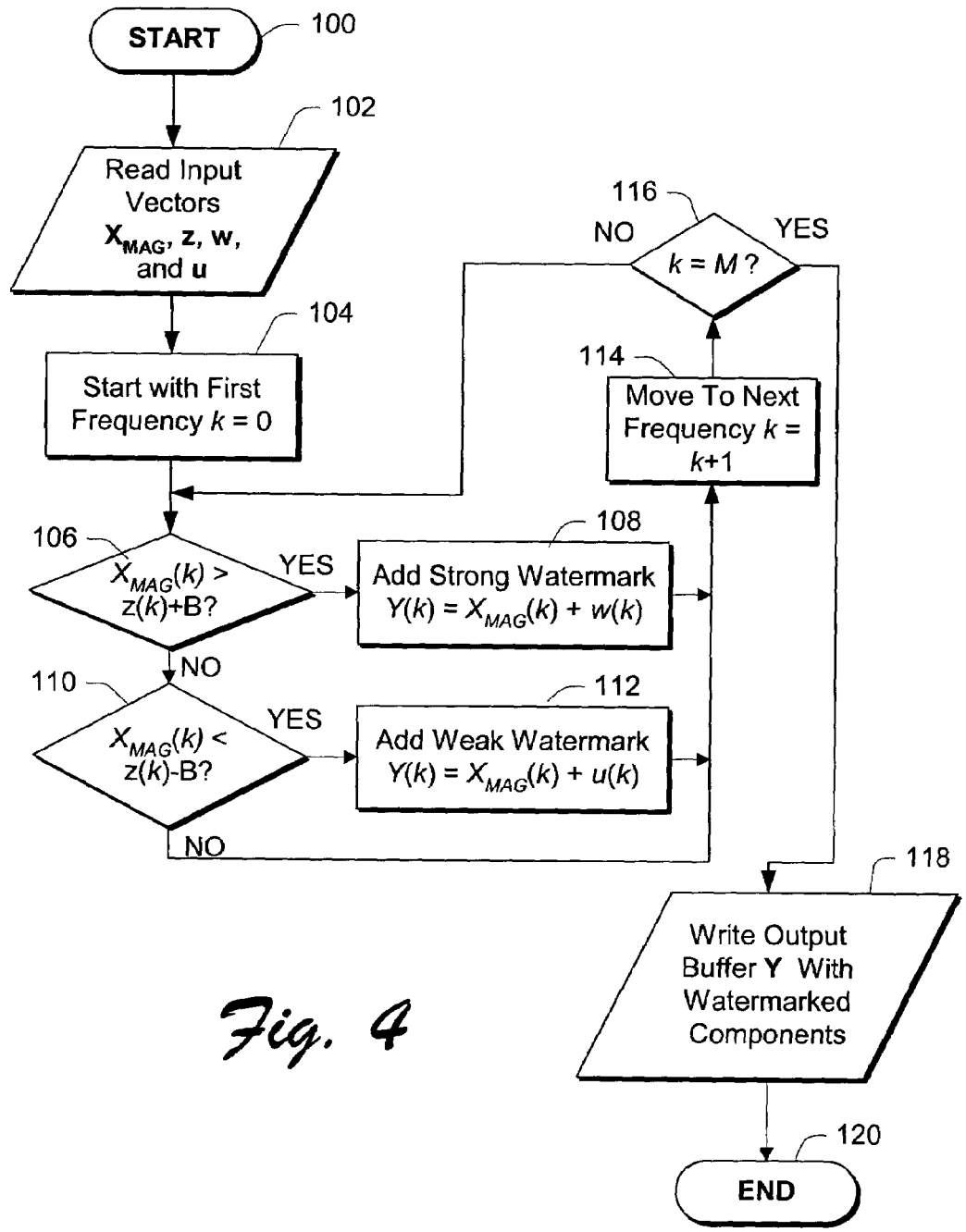
FIG. 4 is a flow diagram showing the watermarking process of inserting strong and weak watermarks into an audio signal.

FIG. 4 shows a watermark insertion process performed by the watermark insertion unit 70. These steps may be performed in software, hardware, or a combination thereof. At the start of the process, the watermark insertion unit 70 reads the magnitude frequency components $X_{MAG}(k)$, the hearing thresholds z(k), the strong watermark vector w(k), and the weak watermark vector u(k) (steps 100 and 102). Corresponding values in these vectors are passed to respective insertion operators 72(0)–72(M−1). After the frequency is initialized (i.e., k=0) (step 104), the watermark insertion unit 70 begins cycling through the M samples and determining whether any given signal rises above an associated hearing threshold, resulting in application of a strong watermark, or falls below the hearing threshold, resulting in application of the weak watermark.

At step 106, the $k^{th}$ insertion operator 72(k) evaluates whether the magnitude frequency components $X_{MAG}(k)$ is greater than the hearing threshold z(k) plus a buffer value B. If it is, the insertion operator 72(k) adds the strong watermark component w(k) to the magnitude frequency components $X_{MAG}(k)$ to produce the watermarked magnitude frequency component Y(k) (step 108). Referring to FIG. 3, sample 96a is an example of the situation where the signal exceeds the hearing threshold by a value B (not shown), and hence this sample would be reduced by −Q as a result of the associated watermark component 96b.

If the signal does not exceed the hearing threshold by a value B, the insertion operator 72(k) discerns whether the magnitude frequency components $X_{MAG}(k)$ is less than the hearing threshold z(k) minus a buffer value B (step 110) If so, the insertion operator 72(k) adds the weak watermark component u(k) to the magnitude frequency components $X_{MAG}(k)$ to produce the watermarked magnitude frequency component Y(k) (step 112). Referring to FIG. 3, sample 98a is an example of the situation where the signal falls below the hearing threshold by a value B (not shown), and hence this sample is increased by Q as a result of the associated watermark component 98b.

If the signal fails to exceed or be less than the hearing threshold by a value B, the insertion operator takes no action. The buffer value B thus defines a dead zone about the threshold region for which the signal component is not significantly above or below the threshold to be watermarked. Typical values of B range from 1 dB to 8 dB.

At step 114, the watermark insertion unit 70 proceeds to the next frequency (i.e., k=k+1). Assuming this is not the last M sample (i.e., step 116), the dual watermark analysis continues for the next signal sample. However, once the watermark insertion unit 70 processes all M samples, it writes the watermarked vector Y(k) to the IMCLT component 80 and the process is completed for this block (steps 118 and 120).

This insertion process advantageously provides two different watermarks with different purposes. The strong watermark is firmly embedded into the audible signal. The strong watermark cannot be removed and survives all typical kinds of processing as well as malicious attacks that attempt to remove the watermark from the signal. The weak watermark is lightly implanted into the non-audible portions of the signal. These are the samples most likely to be removed during signal processing (e.g., compression) and hence provide a valuable indication as to whether the audio signal is a copy, rather than an original.

Watermark Detection

Figure 5:
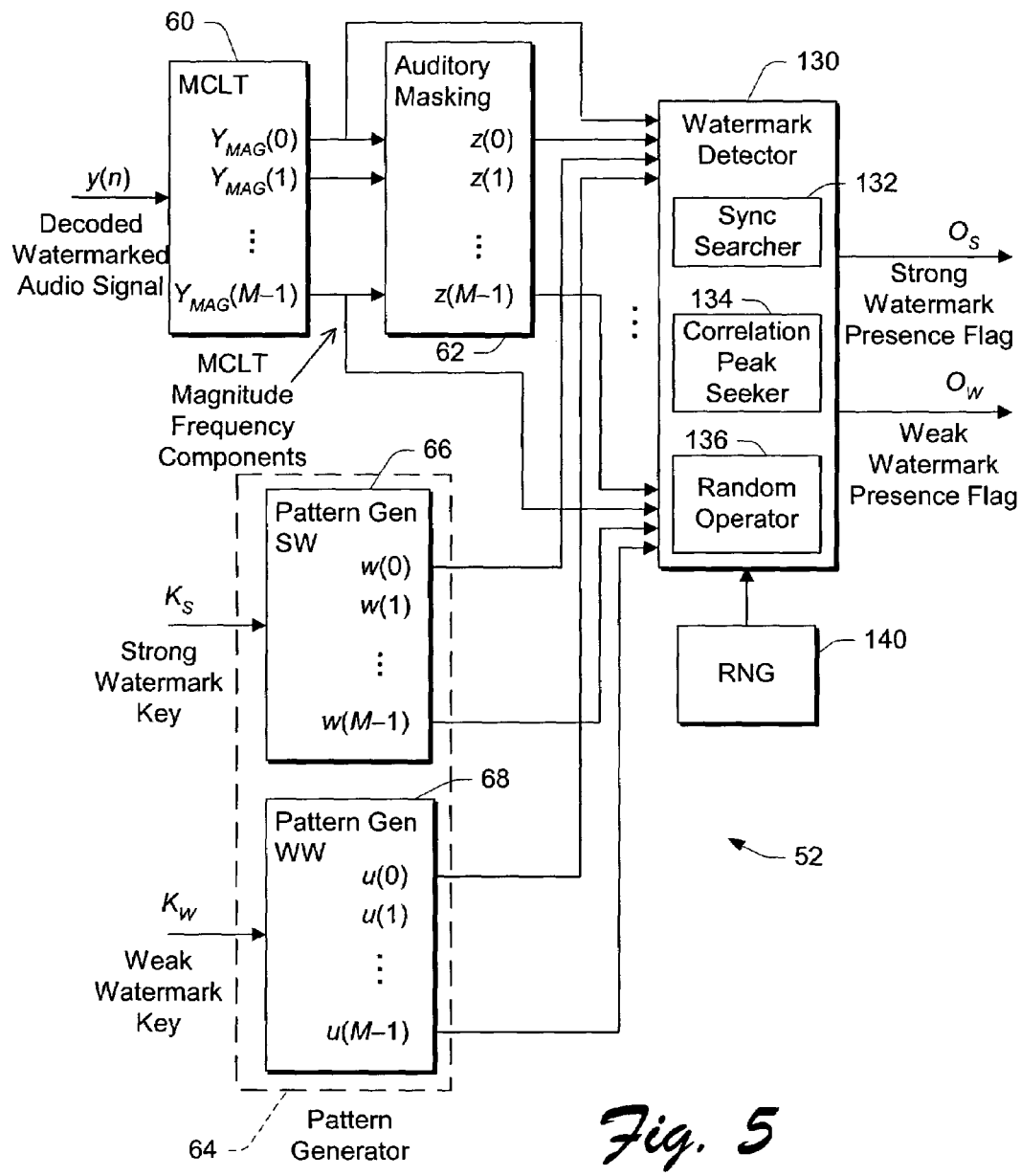
FIG. 5 is a block diagram of a watermarking detecting unit implemented, for example, at the client.

FIG. 5 shows one implementation of the watermark decoding system 52 that executes on the client 26 to detect whether the content is original or a copy (or fake). To detect the strong and weak watermarks, the system finds whether the corresponding patterns {w(k)} and {u(k)} are present in the signal.

Like the encoder system 32, the watermark decoding system 52 has an MCLT component 60, an auditory masking model 62, and a pattern generator 64. The MCLT component 60 receives a decoded audio signal y(n) and transforms the signal to the frequency domain, producing the vector Y(k) having a magnitude component $Y_{MAG}(k)$ and phase component $\phi(k)$. The auditory masking model 62 computes a set of hearing thresholds z(k) (k=0, 1, . . . , M−1) based on the magnitude components $Y_{MAG}(k)$. Since the thresholds are computed from $Y_{MAG}(k)$, as opposed to $X_{MAG}(k)$, the threshold vector z(k) will not be identical to the vector z(k) computed at the insertion unit 70, but the small differences caused by the watermarks do not affect operation of the watermark detector. A pattern generator 64 creates strong and weak watermark vectors w(k) and u(k).

Unlike the encoder system 32, the watermarking decoding system 52 has a watermark detector 130 that processes all available blocks of the watermarked signal $\{Y_{MAG}(k)\}$, the hearing thresholds {z(k)}, and the strong and weak watermark patterns {w(k)} and {u(k)}. The watermark detector 130 has a synchronization searcher 132, a correlation peak seeker 134, and a random operator 136. The decoding system 52 also has a random number generator (RNG) 140 that provides a random variable $\epsilon$ to the watermark detector 130 to thwart a sample-by-sample attack. The operation of these modules is described below in more detail with reference to FIG. 6.

In general, there are two basic problems in detecting the watermark patterns:

1. Determine which T-block interval of the watermarked audio signal contains the watermark pattern. This is the synchronization problem.
2. Detect if the watermark corresponding to a particular set of keys $K_S$ and $K_W$ is present in that T-block interval of the signal.

The two problems are related and are solved in conjunction. So, for discussion purposes, assume that there is perfect synchronization in that the location of the T-block watermark interval is known. This removes the first problem, which will be addressed below in more detail. Also, assume that the detection process is focused on detecting only the strong watermark. The process for detecting the weak watermark is the same, except that the weak watermark pattern {u(k)} replaces the strong watermark pattern {w(k)}.

Let y be a vector formed by all coefficients {Y(k)}. Furthermore, let x, z, and w be vectors formed by all coefficients {X(k)}, {z(k)}, and {w(k)}, respectively. All values are in decibels (i.e., in a log scale). Furthermore, let y(i) be the $i^{th}$ element of a vector y. The index i varies from 0 to K−1, where K=TM.

Watermark insertion is given by, $$y=x+w, \text{ or } y(i)=x(i)+w(i), i=0, 1, \ldots, K-1 \quad (1)$$

where the actual vector w may have some of its elements set to zero, depending on the values of the hearing threshold vector z. Note that strictly speaking the sum in Equation (1)

is not a linear superposition, because the values w(i) are modified based on v(i), which in turn depends on the signal components x(i).

Now, consider a correlation operator NC defined as follows:

$$NC \equiv \frac{\sum_{i=0}^{K-1} y(i)w(i)}{\sum_{i=0}^{K-1} w^2(i)} \quad (2)$$

In the case where the signal is not watermarked, y(i) x(i) and the correlation measure is equal to:

$$NC_0 \equiv \frac{\sum_{i=0}^{K-1} x(i)w(i)}{\sum_{i=0}^{K-1} w^2(i)} \quad (3)$$

Since the watermark values w(i) have zero mean, the numerator in Equation (3) will be a sum of negative and positive values, whereas the denominator will be equal to $Q^2$ times the number of indices in the set I. Therefore, for a large K, the measure $NC_0$ will be a random variable with an approximately normal (Gaussian) probability distribution, with an expected value of zero and a variance much smaller than one.

In the case where the signal is watermarked, y(i)=x(i)+w(i) and the correlation measure is equal to:

$$NC_1 \equiv \frac{\sum_{i=0}^{K-1} y(i)w(i)}{\sum_{i=0}^{K-1} w^2(i)} = \frac{\sum_{i=0}^{K-1} [x(i)+w(i)]w(i)}{\sum_{i=0}^{K-1} w^2(i)} = NC_0 + 1 \quad (4)$$

As seen in Equation (4), if the watermark is present, the correlation measure will be close to one. More precisely, $NC_1$ will be a random variable with an approximately normal probability distribution, with an expected value of one and a variance much smaller than one.

The correlation peak seeker 134 in the watermark detector 130 determines the correlation operator NC. From the value of the correlation operator NC, the watermark detector 130 decides whether a watermark is present or absent. In its most basic form, the watermark presence decision compares the correlation operator NC to a detection threshold "Th", forming the following simple rule:

If NC≦Th, the watermark is not present.
If NC>Th, the watermark is present.

The detection threshold "Th" is a parameter that controls the probabilities of the two kinds of errors:

1. False alarm: the watermark is not present, but is detected as being present.
2. Miss: the watermark is present, but is detected as being absent.

If Th=0.5, the probability of a false alarm "Prob(false alarm)" equals the probability of a miss "Prob(miss)". However, in practice, it is typically more desirable that the detection mechanism error on the side of never missing detection of a watermark, even if in some cases one is falsely detected. This means that Prob(miss)<<Prob(false alarm) and hence, the detection threshold is set to Th<0.5. In some applications false alarms may have a higher cost. For those, the detection threshold is set to Th>0.5.

The decision rule may be slightly modified to account for a small random variance "ϵ" generated by the random number generator 140 (FIG. 5). The modified rule is as follows:

If NC<Th+ϵ, the watermark is not present.
If NC>Th+ϵ, the watermark is present.

The random threshold correction ϵ is a random variable with a zero mean and a small variance (typically around 0.1 or less). It is preferably truly random (e.g. generated by reading noise values on a physical device, such as a zener diode).

The slightly randomized decision rule protects the system against attacks that modify the watermarked signal until the detector starts to fail. Such attacks could potentially learn the watermark pattern w(i) one element at a time, even if at a high computational cost. By adding the noise ϵ to the decision rule, such attacks are prevented from working.

Returning to the synchronization problem, the test watermark pattern and the watermarked signal need to be aligned for the correlation detector to work properly. This means that the strong watermark values w(i) (or weak watermark values u(i)) in the test pattern and watermarked signal match. If not, the expected value of NC decays rapidly from one.

The synchronization searcher module 132 finds the right sync point by searching through a sequence of starting points for the T-block group of samples that will be used to build the signal vector. A sync point r is initialized (i.e., r=0) and incremented in steps R. At each interval, the correlation peak seeker module 134 recomputes the correlation NC(r). The true correlation is chosen as:

$$NC = \max_r NC(r) \quad (5)$$

The sync point increment R is set such that NC(r) and NC(r+R) differ significantly. If R is set to one, for example, an excessive amount of computations will be performed. In practice, R is typically set to about 10–50% of the block size M.

Figure 6:
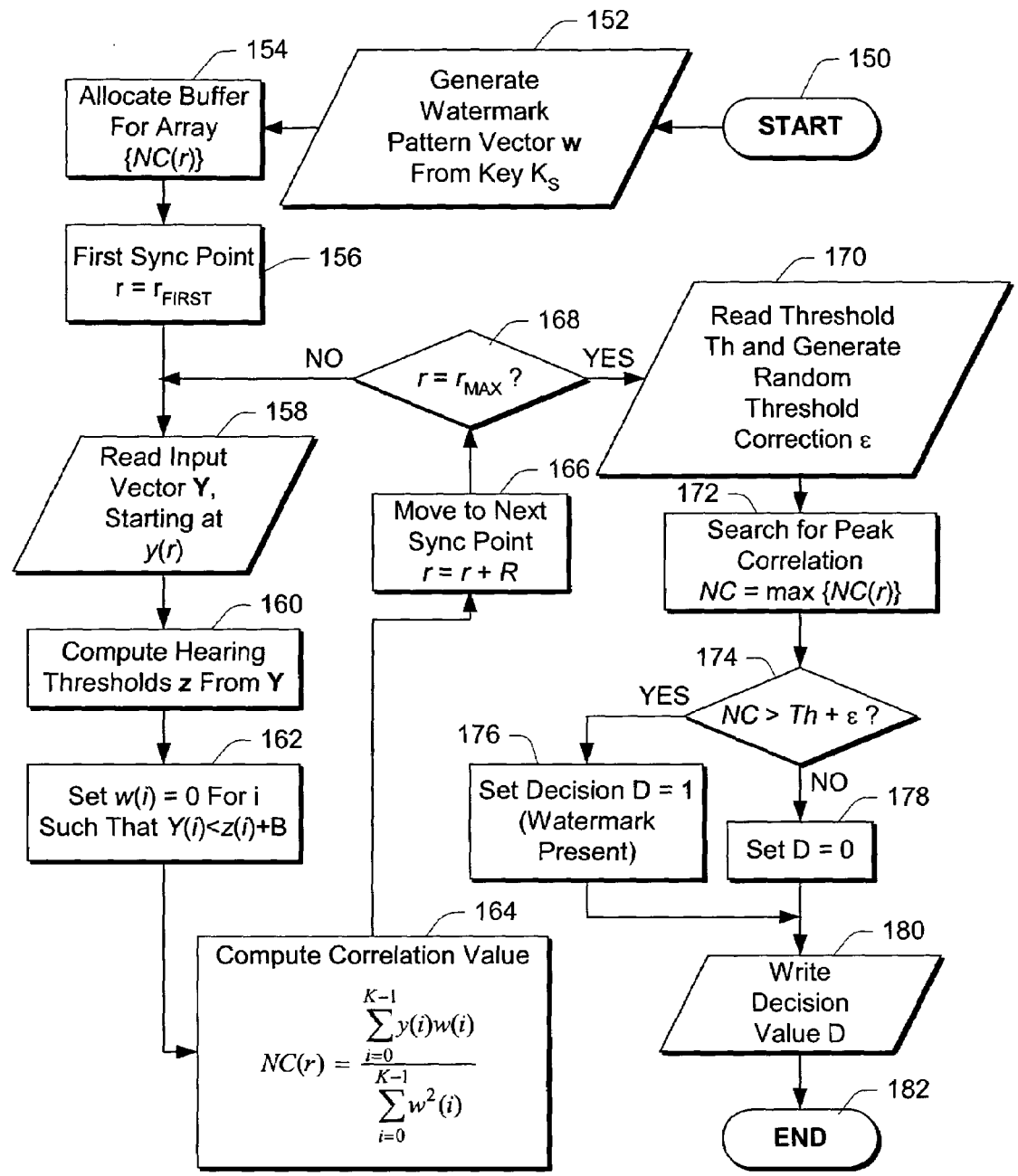
FIG. 6 is a flow diagram showing a watermark detection process of detecting strong and weak watermarks in an audio signal.

FIG. 6 shows a watermark detection process performed by the watermark detector 130. These steps may be performed in software, hardware, or a combination thereof. The process is illustrated as detecting the strong watermark w(k), but the weak watermark can be detected using the same process, replacing the strong watermark pattern {w(i)} with the weak watermark pattern {u(i)}.

At the start of the process, the watermark pattern generator 64 generates a strong watermark vector {w(i)} using the strong key $K_S$ (steps 150 and 152). The detecting system 52 allocates buffer for a correlation array {NC(r)} that will be computed (step 154) and initializes the sync point r to a first sample (step 156).

At step 158, the MCLT module 60 reads in the audio signal y(n), starting at y(r), and computes the magnitude values $Y_{MAG}(k)$. The auditory masking model 62 then computes the hearing threshold z(k) from $Y_{MAG}(k)$ (step 160). The strong watermark, magnitude frequency components, and hearing thresholds are passed to the watermark detector 130.

At step 162, the watermark detector 130 tests for a condition where there is no watermark by setting the watermark vector w(i) to zero, such that the watermarked input vector Y(i) is less than the hearing threshold by buffer value B. The watermark detector 130 then computes the correlation value NC for the sync point r (step 164). The process of computing correlation values NC continues for subsequent sync points, each incremented from the previous point by step R (i.e., r=r+R) (step 166), until correlation values for a maximum number of sync points has been collected (step 168).

At step 170, the watermark detector 130 reads the detection threshold "Th" and generates the random threshold correction $\epsilon$. More particularly, the random operator 136 computes the random threshold correction $\epsilon$ based on a random output from the random number generator 140. Then, at step 172, the correlation peak seeker 134 searches for peak correlation such that:

$$NC = \max_r NC(r)$$

If the correlation value NC>Th+$\epsilon$, the watermark is present and a decision flag D is set to one (steps 174 and 176). Otherwise, the watermark is not present and the decision flag D is reset to zero (step 178). The watermark detector 130 writes the decision value D and the process concludes (steps 180 and 182).

The process in FIG. 6 is repeated or performed concurrently to detect whether the weak watermark is present. The only difference in the process for detecting the weak watermark is that the strong watermark pattern vector w(i) is replaced by the weak watermark pattern vector u(i), and step 162 is modified to set u(i)=0 when Y(i) is higher than the hearing threshold by the buffer value B.

After the decision values have been computed for both the strong and weak watermarks, the watermark detector 130 outputs two flags. A strong watermark presence flag $O_S$ indicates whether the strong watermark is present and a weak watermark presence flag $O_W$ indicates whether the weak watermark is present. If both watermarks are present, the audio content is original. Absence of the weak watermark indicates that the audio stream is a copy of an original. If both watermarks are absent, the content is neither original nor a copy of an original.

Figure 7:
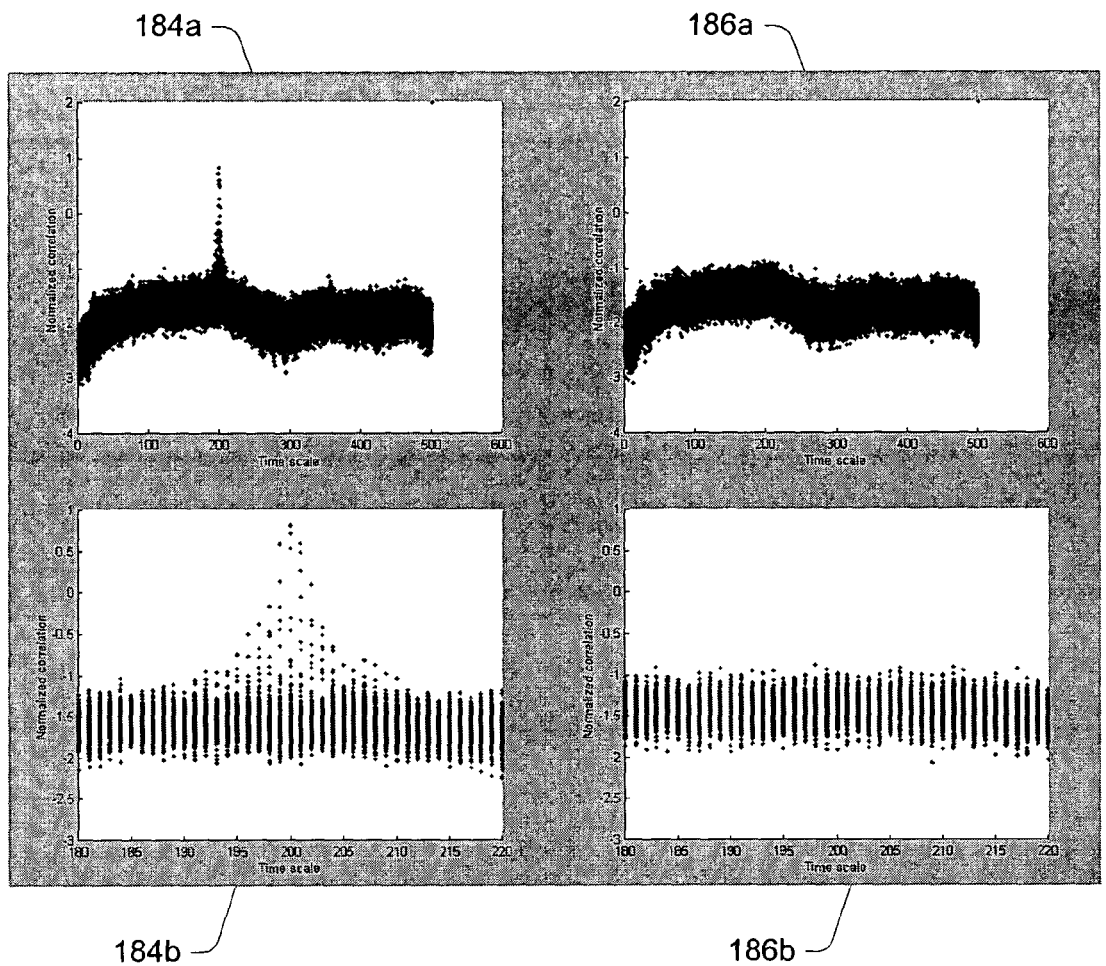
FIG. 7 show time-scale plots of normalized correlation values used to detect presence and absence of a watermark.

FIG. 7 depicts time-scale plots of normalized correlation values obtained from the watermark detector 130 during a search for a watermark in an audio clip. Plots 184a and 184b demonstrate an audio clip that has been watermarked. A peak of values of the normalized correlation illustrated in plots 184a and 184b clearly indicates existence and location of the watermark. Plots 186a and 186b demonstrate an audio clip that has not been correlated with the test watermark.

A number of experiments were performed to determine the distributions of normalized correlation for different watermarking schemes. Each experiment was conducted on four representative audio samples (composers: Wolfgang Amadeus Mozart, Pat Metheney, Tracy Chapman, and Alanis Morissette). Each benchmark audio clip was watermarked 500 times. Correlation tests were performed for each watermarked version of the audio clip, one with a correct watermark and 99 with incorrect watermarks. There was no significant difference of statistical behavior of the applied watermarking scheme for any of the benchmark audio clips.

Figure 8:
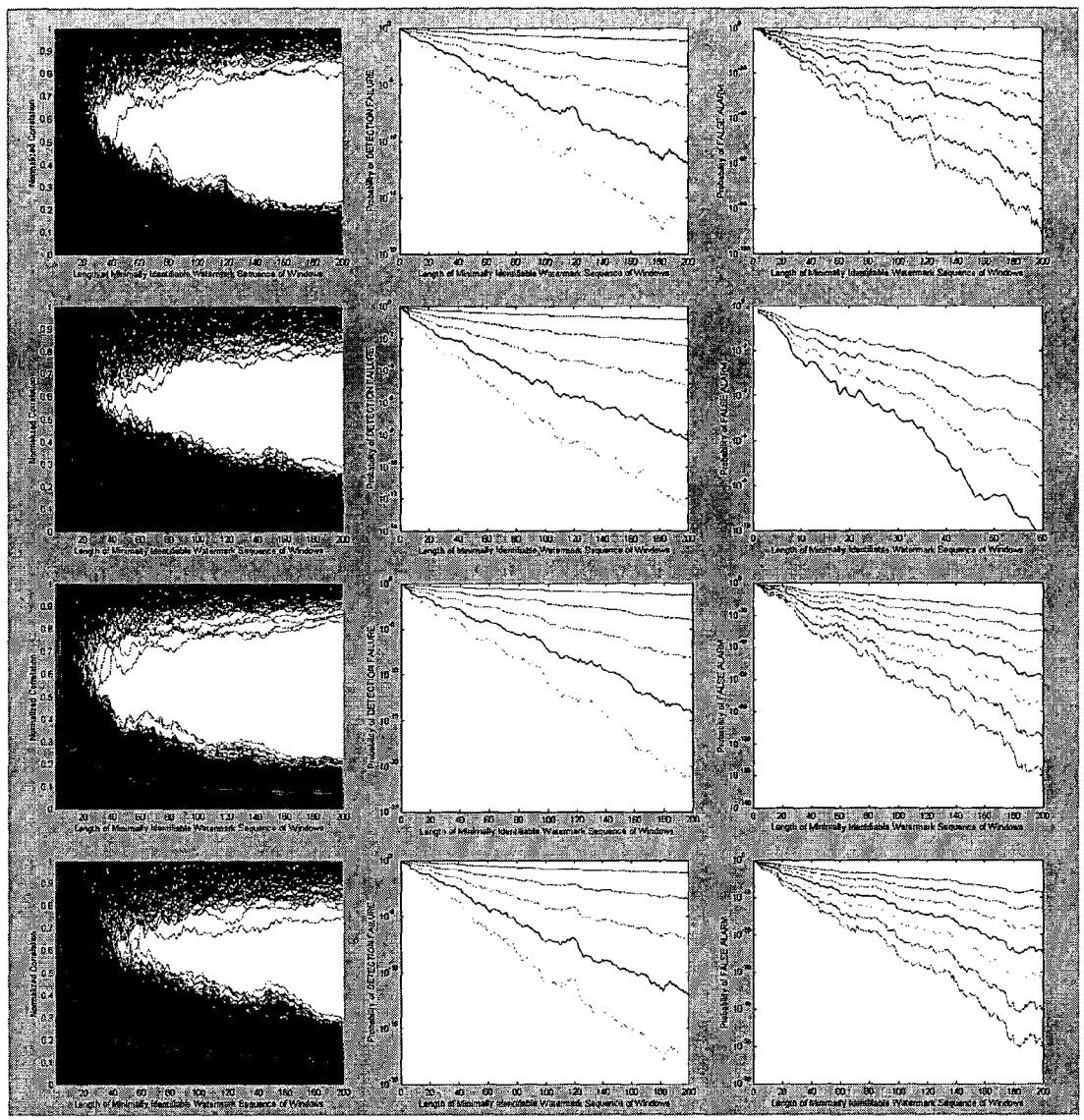
FIG. 8 shows plots of the distribution of normalized correlation for four different artists.

FIG. 8 depicts the results obtained from four different evaluations of the distribution of normalized correlation. Each row of diagrams in FIG. 8 depicts the results for one of the following four watermarking schemes:
  (i) dboffset=2 dB, DFS=1%, fair cut of inaudible portion of frequency spectrum;
  (ii) dboffset=2 dB, DFS=1%, correlation test performed on the entire frequency spectrum;
  (iii) dboffset=2 dB, DFS=0.5%, fair cut of inaudible portion of the frequency spectrum; and
  (iv) dboffset=2 dB, DFS=1%, unfair cut of the inaudible portion of the frequency spectrum.

For each tested watermarking scheme, the following information is displayed in each column of the diagrams in FIG. 8:
  a diagram of the convergence of a normalized correlation as well as the standard deviation of the distribution;
  a diagram that quantifies the probability of a false alarm; and
  a diagram that quantifies the probability of misdetection for a given length of the watermark sequence (X-axis on all diagrams).

The depicted information clearly indicates that the consideration of only the audible portion of the audio clip as well as the fairness of its selection improves the confidence in making a decision for a particular value of the correlation for several orders of magnitude.

For further evaluation of the security of the content protection mechanism, we have selected a representative algorithm with the following properties:
  Window size=4096 time-domain samples,
  Number of bits embedded per window=153 bits,
  Dynamic frequency shift (DFS)=±0.5%
  Dynamic time warping (DTW)=±0.75%,
  R—redundancy in time=20 windows, M=10 windows,
  $L_{MIN}$=45~45 seconds, Decision Threshold Th=0.70,
  $P_{FA} < \Omega = 10^{-9}$, and $P_{MD} < \Xi = 10^{-2}$.

If it is assumed that the watermark is embedded into an audio clip at a pseudo-randomly selected position within the range from the $E_{MIN}$ to the $E_{MAX}$ block and the search space for the detection algorithm is bounded to static time warping=10% and DTW dynamic time warping=6%, the total number of correlation tests performed during the exhaustive search for watermark existence equals:

$$\text{Tests: Tests} = \frac{E_{\max} - E_{\min}}{M} \frac{2STW}{DTW} \frac{2SFS}{DFS}$$

where STW is the static time warp, DTW is the dynamic time warp, SFS is the static frequency shift, and DFS is the dynamic frequency shift.

If the watermark is embedded starting from at earliest the tenth and at the latest the thirtieth second of the audio clip, this formula indicates that the exhaustive search would require approximately 17,000 correlation tests. Since each correlation test requires 153·45 multiply-additions, the computational complexity of the audio watermarking algorithm for this set of parameters is at the level of $10^8$ multiply-additions. Obviously, for a 100MFLOPS machine, the exhaustive watermark detection process would require approximately one second of computation time. This performance is realistically expected in real life applications because all popular Internet music standards MP3 and MSAudio store the audio content as a compressed collection of frequency magnitude samples.

Exemplary WMA Implementation

Figure 9:
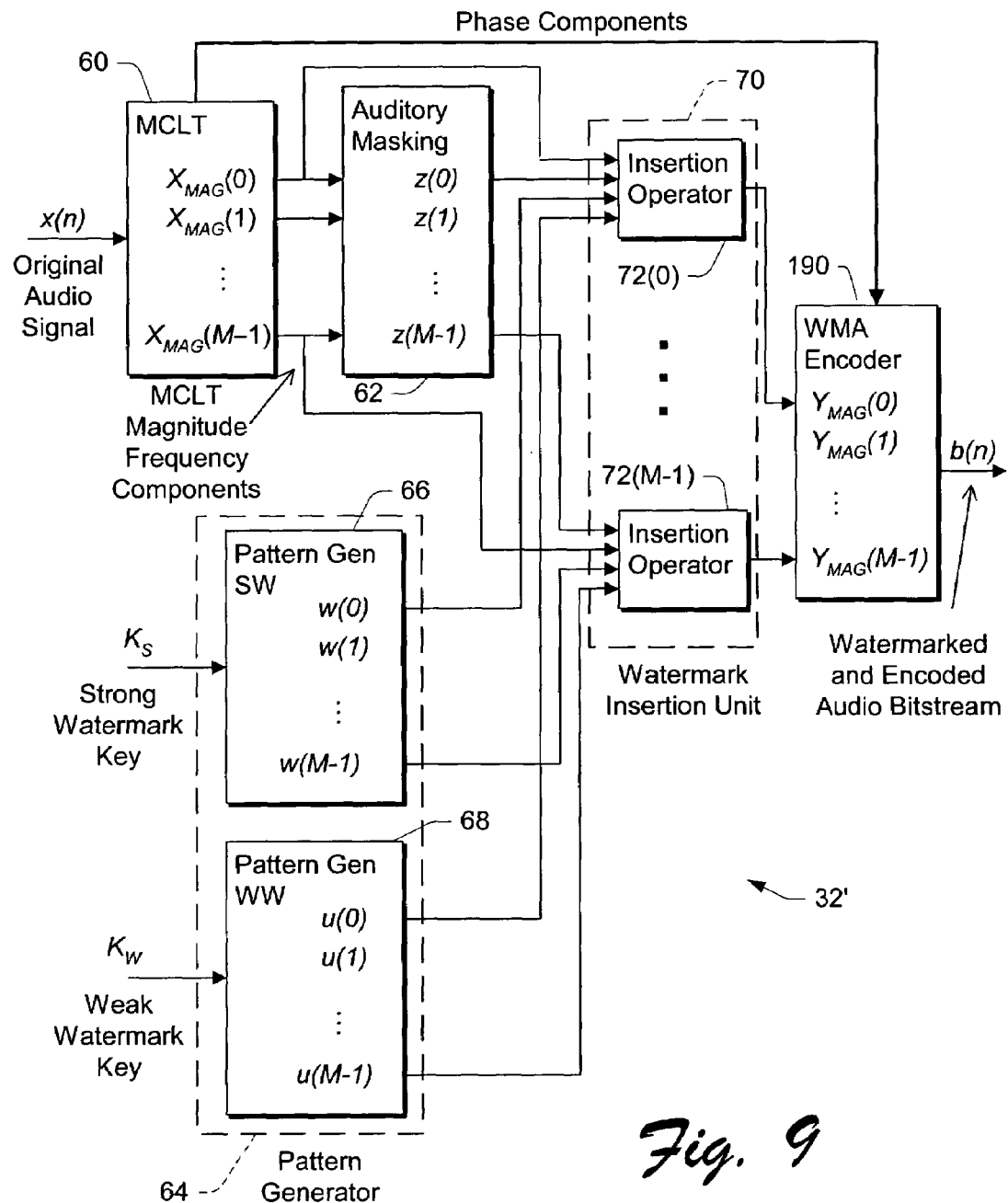
FIG. 9 is a block diagram of a watermarking encoding unit implemented according to a second implementation.
Figure 10:
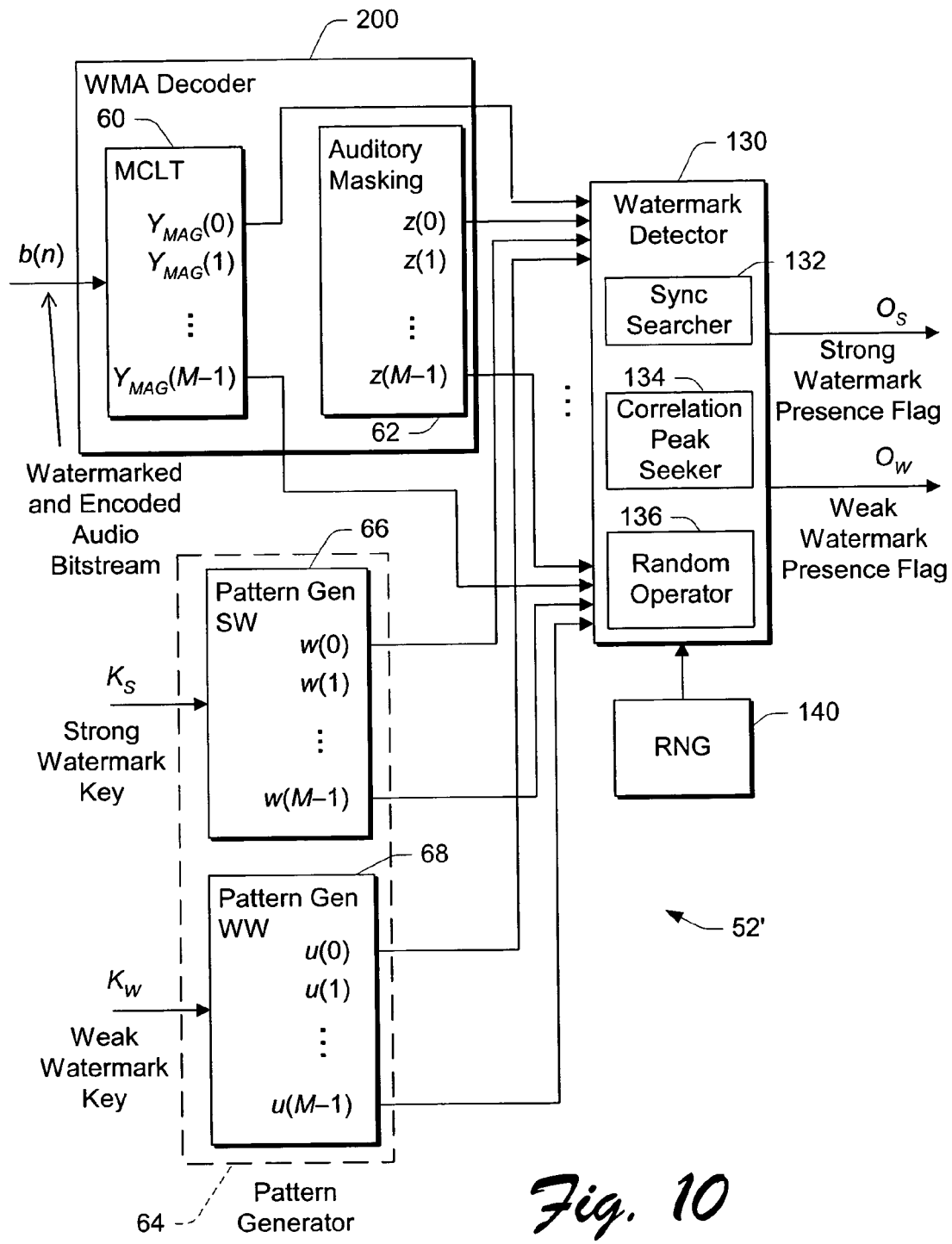
FIG. 10 is a block diagram of a watermarking detecting unit implemented according to a second implementation.

FIGS. 9 and 10 illustrate the watermark encoding system 32' and watermark decoding system 52', respectively, integrated into an audio compression/decompression unit, such as the Windows Media Audio (WMA) module available from Microsoft Corporation. In FIG. 9, the IMCLT module 80 is integrated into the WMA encoder 190, which converts the frequency-domain signal $\{Y_{MAG}(k), \phi(k)\}$ to a time-domain watermarked and encoded signal block b(n). In this manner, the compression unit and the watermark encoding system utilize the same frequency magnitude components for both compression and watermarking, thereby gaining some computational efficiency. In FIG. 10, the MCLT module 60 and auditory masking model 62 are integrated into a WMA decoder 200. Again, this allows the decompression unit (WMA decoder 200) and the watermark detecting system to utilize the same frequency magnitude components for both decompression and detection.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An audio watermarking system comprising:
    a pattern generator configured to generate both a strong watermark and a weak watermark; and
    a watermark insertion unit configured to selectively insert the strong watermark into at least one segment of an audio signal and to selectively insert the weak watermark into at least one other segment of the audio signal, so that at least some resulting segments have either the strong or the weak watermark inserted therein, but not both, and
    wherein the watermark insertion unit further configures the segments of the audio signal to enable detection of the inserted strong and weak watermarks based on a randomized correlation measure, the randomized correlation measure having a first expected value when a corresponding one of the segments contains no strong or weak watermark, and having a second expected value when the corresponding one of the segments contains either the strong or weak watermark.

2. The audio watermarking system as recited in claim 1, wherein the randomized correlation measure has an approximately normal probability distribution and a variance substantially smaller than one.

3. The audio watermarking system as recited in claim 2, wherein the first expected value of the randomized correlation measure is approximately zero, and the second expected value of the randomized correlation measure is approximately one.

4. An audio watermarking system as recited in claim 1, wherein the one or more resulting segments having the strong watermark inserted therein are distinct in the frequency domain from the one or more resulting segments having the weak watermark inserted therein.

5. An audio watermarking architecture, comprising:
    a watermark encoding system configured to selectively insert a strong watermark into at least one segment of an audio signal and to selectively insert the weak watermark into at least one other segment of the audio signal, so that at least some resulting segments have either the strong or the weak watermark inserted therein, but not both; and
    a watermark detecting system configured to detect a presence of a watermark in the segments of the audio signal and, if a watermark is present, further configured to determine whether the present watermark is either the strong watermark or the weak watermark, and wherein the watermark detecting system is configured to detect the presence of the watermark based on a randomized correlation measure, the randomized correlation measure having a first expected value when a corresponding one of the segments contains no strong or weak watermark, and having a second expected value when the corresponding one of the segments contains either the strong or weak watermark, the first and second expected values being different.

6. An audio watermarking architecture as recited in claim 5, wherein the watermark encoding system resides at a content producer to watermark original audio content and the watermark detecting system resides at one or more clients to detect the watermarks and play the original audio content.

7. An audio watermarking architecture as recited in claim 5, wherein the one or more resulting segments having the strong watermark inserted therein are distinct in the frequency domain from the one or more resulting segments having the weak watermark inserted therein.

8. A method for watermarking an audio signal, comprising:
    watermarking a first portion of the audio signal with a strong watermark;
    watermarking a second portion of the audio signal with a weak watermark, wherein the first and second portions are separate; and
    detecting at least one of the strong and weak watermarks based on a randomized correlation measure, the randomized correlation measure having a first expected value when a corresponding one of the first and second portions contains no watermark, the randomized correlation measure having a second expected value when the corresponding one of the first and second portions contains either the strong or the weak watermark.

9. A method as recited in claim 8, wherein the first and second portions are separate in the frequency domain.

10. A method comprising:
    selectively encoding portions of an audio signal with a strong watermark and selectively encoding other portions of the audio signal with a strong watermark, so that at least some resulting portions have either the strong or the weak watermark encoded therein, but not both;
    detecting a presence of a watermark in the portions of the audio signal based on a randomized correlation measure, the randomized correlation measure having a first expected value when a corresponding one of the portions contains no watermark, the randomized correlation measure having a second expected value when the corresponding one of the portions contains either the strong or the weak watermark; and
    if a watermark is present, determining whether the present watermark is either the strong watermark or the weak watermark.

11. A method as recited in claim 10, wherein the one or more resulting portions having the strong watermark inserted therein are distinct in the frequency domain from the one or more resulting portions having the weak watermark inserted therein.

12. A computer readable medium having computer executable instructions for:
watermarking a first portion of an audio signal with a strong watermark;
watermarking a second portion of the audio signal with a weak watermark, wherein the first and second portions are separate; and
detecting at least one of the strong and weak watermarks based on a randomized correlation measure, the randomized correlation measure having a first expected value when a corresponding one of the first and second portions contains no watermark, the randomized correlation measure having a second expected value when the corresponding one of the first and second portions contains either the strong or the weak watermark.

13. A medium as recited in claim 12, wherein the first and second portions are separate in the frequency domain.

14. An audio watermarking system comprising:
a pattern generator configured to generate both a strong watermark and a weak watermark;
a watermark insertion unit configured to insert the strong watermark into a first segment of the audio signal and to insert the weak watermark into a second segment of the audio signal, wherein the first and second segments are separate; and
a detector configured to detect the presence of the strong or weak watermark based on a randomized correlation measure, the randomized correlation measure having an expected value of approximately zero when a corresponding one of the first and second segments contains no watermark, and having the expected value of approximately one when the corresponding one of the first and second segments contains either the strong or the weak watermark.

15. An audio watermarking system as recited in claim 14, wherein the watermark insertion unit selectively chooses segments for insertion of the watermarks according to an audible measure of the segments.

16. An audio watermarking system as recited in claim 14, wherein the watermark insertion unit selectively chooses segments for insertion of the strong watermark according to an audible measure of the segments.

17. An operating system comprising an audio watermarking system as recited in claim 14.

18. A system as recited in claim 14, wherein the first and second segments are separate in the frequency domain.

* * * * *